June 5, 1951            G. CARLSON            2,555,470
EMERGENCY SAFETY DEVICE FOR SKID CHAINS
Original Filed Dec. 22, 1944            2 Sheets—Sheet 1
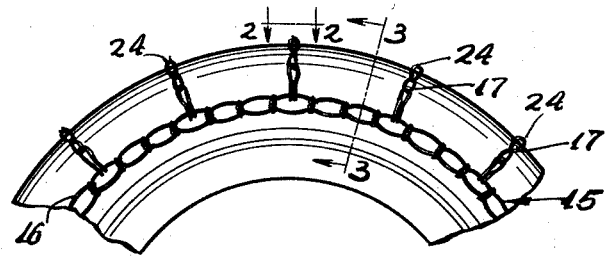
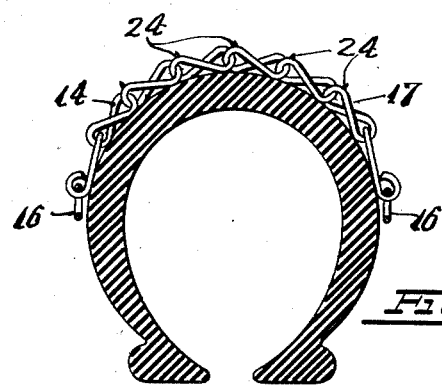
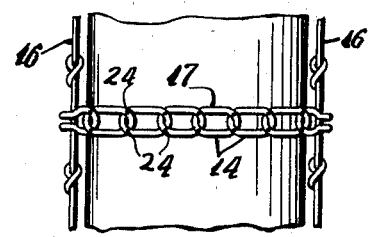
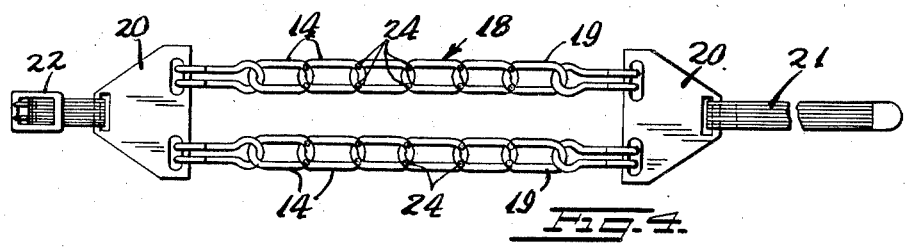
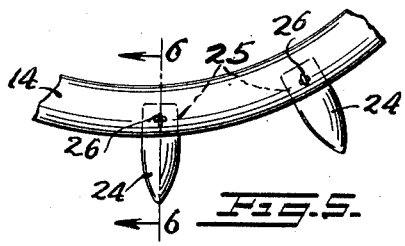
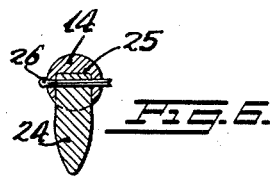
INVENTOR.
GEORGE CARLSON
BY
ATTORNEY June 5, 1951 G. CARLSON 2,555,470
EMERGENCY SAFETY DEVICE FOR SKID CHAINS
Original Filed Dec. 22, 1944 2 Sheets-Sheet 2
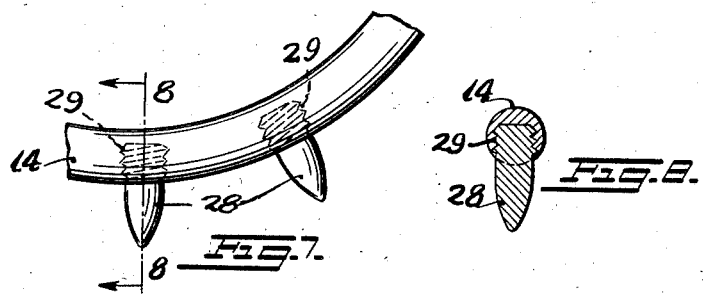
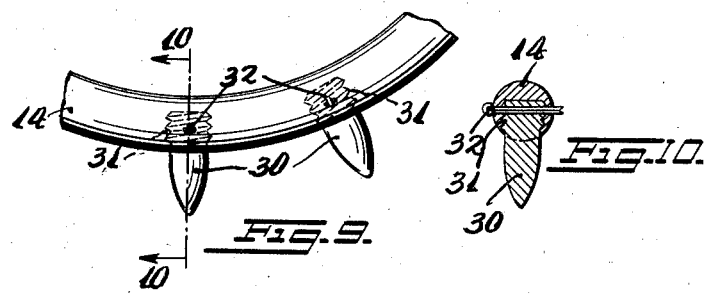
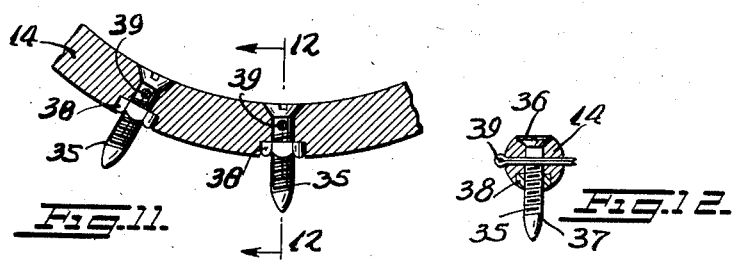
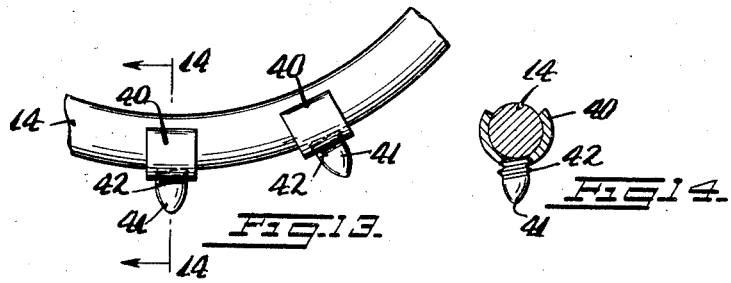
INVENTOR.
GEORGE CARLSON
BY
ATTORNEY Patented June 5, 1951

2,555,470

UNITED STATES PATENT OFFICE 2,555,470

EMERGENCY SAFETY DEVICE FOR SKID CHAINS

George Carlson, Hawthorne, N. Y.

Substituted for abandoned application Serial No. 569,298, December 22, 1944. This application August 21, 1948, Serial No. 45,553

2 Claims. (Cl. 152—245)

This invention relates to new and useful improvements in emergency safety devices for skid chains.

The invention particularly contemplates the use of several different types of case hardened steel, heat treated caulks, particularly adapted to be conveniently mounted upon the links of skid chains of vehicles.

The invention proposes so constructing the caulks that they may be mounted upon the usual types of skid chains which engage completely around the wheel, or the types which engage across several points of the wheel.

The invention proposes several novel ways for mounting and holding the caulks in position on the links of the chains. In one form of the invention it is proposed to make use of cotter pins. In another form it is proposed to thread the back ends of the caulks. In still another form it is proposed to use holding nuts. It is also proposed to use any combination of these holding means.

The invention also contemplates an embodiment in which C-shaped clips are engaged upon the links, and the hard steel tread caulks are mounted on these clips.

From the above it will be obvious that the dominating feature of the invention resides in providing the links with protuberances, or roughened areas.

Still further the invention proposes the construction of improved skid chains, as mentioned, which may be manufactured and sold at a low cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary side elevational view of a wheel provided with a skid chain constructed in accordance with this invention.

Fig. 2 is a fragmentary enlarged plan view looking in the direction of the line 2—2 of Fig. 1.

Fig. 3 is a fragmentary transverse sectional view taken on the line 3—3 of Fig. 1.

Fig. 4 is a plan developed view of another type of skid chain, to which this invention is applied.

Fig. 5 is a fragmentary enlarged elevational view of one of the links of a skid chain embodying this invention.

Fig. 6 is a vertical sectional view taken on the line 6—6 of Fig. 5.

Fig. 7 is another view similar to Fig. 5, but disclosing a modified form of the invention.

Fig. 8 is a sectional view taken on the line 8—8 of Fig. 7.

Fig. 9 is another fragmentary elevational view similar to Fig. 5, but disclosing still another modified form of this invention.

Fig. 10 is a sectional view taken on the line 10—10 of Fig. 9.

Fig. 11 is a fragmentary longitudinal sectional view of a link of another chain embodying still another form of this invention.

Fig. 12 is a transverse sectional view taken on the line 12—12 of Fig. 11.

Fig. 13 is another fragmentary elevational view similar to Fig. 5 but disclosing another form of the invention.

Fig. 14 is a vertical sectional view taken on the line 14—14 of Fig. 13.

In Figs. 1 to 3 there is illustrated a skid chain 15 of the type which engages completely around the tire of a wheel and composed of links 14. This skid chain has an annular chain portion 16 extending along the side faces of the tire, and connected by transverse portions 17. In Fig. 4 another type of skid chain 18 is illustrated, which consists merely of several chains 19 composed of links 14 and mounted between members 20 which are provided with straps 21 and a buckle 22 by which the skid chain may be mounted transversely across the tire of a wheel at one point. Several of these skid chains are generally used on a wheel.

The two types of skid chains described in the previous paragraph distinguish from standard skid chains by the fact that certain of their links, those links which are capable of engaging ice and snow on the ground, are provided with steel, case hardened heat treated, caulks 24. These caulks 24 may also be treated to prevent rusting. The caulks 24 are mounted upon the links 14 by forming the links with openings 25 into which the back ends of the caulks 24 engage (see Figs. 5 and 6). Cotter pins 26 engaged through said links 14 and through the back ends of the caulks 24, for removably holding the caulks 24 in position.

In Figs. 7 and 8 there is shown a modified form of the invention, in which each caulk 28 is provided with a threaded back end 29 which threadedly engages into the links 14 of the chains.

In Figs. 9 and 10 still another form of the invention is shown, in which the caulks 30 have threaded inner or back ends 31 which threadedly engage each link 14. Cotter pins 32 are also engaged through each link 14, and through the inner ends of the caulks 39.

In Figs. 11 and 12 still another form of the invention has been shown in which each link 14 is provided with caulks 35 engaged through openings in the link. The inner ends of these caulks 35 are provided with heads 36. The outer ends are formed with threads 37. Nuts 38 engage these threads and assist in holding the caulks 35 in position. Cotter pins 39 engage through each link 14 and the caulks 35 for more securely holding these parts together. It is proposed that each head 36 and each nut 38 be engaged in countersunk portions formed in the link.

In Figs. 13 and 14 still another form of the invention has been disclosed in which each link 14 is provided with one or more C-shaped clips 40 engaged about said links 14 and extending through more than 180 degrees around the link so as to maintain their positions. Each clip 40 is engaged on the link 14 under suitable pressure. Each clip 40 is provided with a steel caulk 41. Each caulk 41 has its inner end formed with threads 42 which threadedly engage through the clip 40 and which abut the link 14 for maintaining its position, and also for preventing the clip 40 from shifting around on the link 14.

The operation of the skid chains is identical to that of the standard skid chains, except for the fact that the links 14 have projecting tread caulks as explained, which engage and grip ice and snow to increase the traction of the chains. When the caulks become worn they may be removed and replaced. This increases the life on a skid chain.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a skid chain formed from wire links, hard steel tread caulks mounted on said links for gripping ice and snow on roads, said caulks being threadedly engaged upon certain of said links which engage the ground, and cotter pins for holding said caulks in position, said caulks being provided with heads on their inner ends, and nuts threadedly engaged on their outer ends, said heads and nuts being engaged in countersunk openings in said links.

2. In a skid chain having a link one side of which is to face a tire upon which the skid chain is mounted, a hard steel caulk mounted through the link and having an enlarged head on the one side of the link and a pointed end projected beyond the outer side of the link, a cotter pin extended through aligned holes formed in the link and said caulk at right angles to said caulk holding said caulk against turning, and a nut threadedly engaged on the pointed end of said caulk, the link having a countersunk opening in its inner side into which said enlarged head engages, the link having a countersunk opening in its outer side into which said nut engages.

GEORGE CARLSON.

REFERENCES CITED

The following references are of record in the file of this patent:

UNITED STATES PATENTS

| Number | Name | Date |
|---|---|---|
| 1,264,463 | Weiner | Apr. 30, 1918 |
| 1,592,522 | Erickson | July 13, 1926 |
| 1,700,272 | Schramm | Jan. 29, 1929 |
| 1,815,278 | Strack et al. | July 21, 1931 |

FOREIGN PATENTS

| Number | Country | Date |
|---|---|---|
| 120,934 | Austria | 1931 |